United States Patent

Guest

[15] 3,675,139

[45] July 4, 1972

[54] ELECTRICAL DEMODULATION SYSTEMS

[72] Inventor: Ashley W. Guest, Waterlooville, England

[73] Assignee: Plessey Handel Und Investments A.G., Zug, Switzerland

[22] Filed: Jan. 11, 1971

[21] Appl. No.: 105,577

[30] Foreign Application Priority Data

Jan. 14, 1970  Great Britain..........................1,731/70

[52] U.S. Cl..............................329/104, 178/66, 325/320, 328/109, 329/112, 329/137
[51] Int. Cl. .....................................................H04l 27/22
[58] Field of Search..................329/110, 112, 104, 137, 120, 329/118; 328/109, 110; 325/320; 178/66

[56] References Cited

UNITED STATES PATENTS

| | | | |
|---|---|---|---|
| 3,054,053 | 9/1962 | Cook | 329/112 X |
| 3,538,345 | 11/1970 | Norz | 329/112 X |
| 3,539,930 | 11/1970 | Strole | 329/112 X |
| 3,564,433 | 2/1971 | Miller | 325/320 X |

*Primary Examiner*—Alfred L. Brody
*Attorney*—Mason, Mason & Albright

[57] ABSTRACT

The system demodulates an input signal in which the data carried in each of successive periods is represented by the phase of the signal during that period with respect to the phase in the preceding period. Two phase detectors respectively produce outputs whose signs are dependent on the phase difference between the input carrier and a phase reference and between the input carrier and the phase reference displaced by 90°. From these outputs, a quadrant detector determines a serial number identifying the phase quadrant in which the input carrier vector lies. A ring counter is stepped to equal this count. The process is repeated during the next period and the counter is re-stepped to match the new count. The number of counts necessary in this re-stepping process is measured by an output counter whose final count identifies the value of the data in the second period. During each period an analogue unit measures the angle of the input vector relative to the beginning of its quadrant, and a comparator increases the count of the ring counter by unity if the angle of the input vector during one period is less than the corresponding angle in the previous period, and thus compensates for noise effects.

16 Claims, 11 Drawing Figures

FIG. 1.

INVENTOR
ASHLEY W. GUEST.
BY
Mason, Mason & Albright
ATTORNEYS

INVENTOR
ASHLEY W. GUEST.
BY
Mason, Mason & Albright
ATTORNEYS

ELECTRICAL DEMODULATION SYSTEMS

BACKGROUND OF THE INVENTION

The invention relates to demodulation systems for dealing with differential or multi-differential phase modulated signals for example, such as DPSK or DPEK signals.

According to the invention, there is provided a demodulation system for demodulating an input signal in which the data carried in each of successive equal-duration periods is represented by the phase of the signal during that period with respect to the phase in the next preceding period, comprising phase-detector means connected to receive the input signal, and operative when supplied with a phase reference valid for two said periods whereby the output of the phase-detector means uniquely identifies the one of a plurality of predetermined phase segments, fixed relative to the phase reference, in which the input signal vector lies, and output means operative to compare the phase positions of the segments identified in two successive periods whereby to detect the phase change of the input vector in the second period with respect to its phase in the first period and to produce a data-indicating signal whose value is dependent on the detected phase change.

According to the invention, there is also provided a demodulation system for demodulating an input signal in which the data carried in each of successive equal-duration periods is represented by the number of equal-length phase-segments through which the input signal vector has moved from its phase-position during the next preceding period, comprising means operative to establish a phase reference valid for at least two successive periods, first detector means operative to compare the phase-position of the input vector with the phase reference and to determine, for each of the two periods, a serial number identifying the particular one of a plurality of successive phase-segments fixed relative to the phase reference in which the input vector lies, second detector means operative to compare the phase position of the input vector with the phase reference to produce for each said period an angle signal representative of the angle of the input vector within the particular phase segment identified for that period, modifying means operative to compare the values of successively produced angle signals and to subtract one from the difference between the serial numbers determined for the two periods if the angle signal determined for the second period is less than that for the first period, and output means operative to produce a data-indicating output signal whose value is proportional to the said difference, after any subtraction therefrom by the modifying means.

DESCRIPTION OF THE DRAWINGS

A demodulation system embodying the invention will now be described, by way of example, with reference to the accompanying drawings in which.

DESCRIPTION OF THE PREFERRED EMBODIMENT

Figure 3:
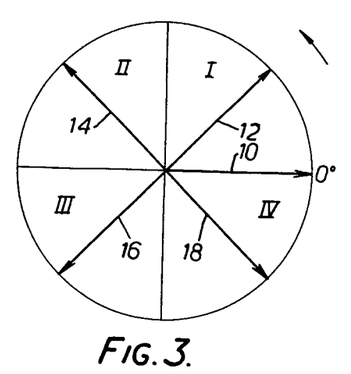
FIGS. 3 to 7 show vector diagrams explaining the operation of the system.

The demodulator to be described is for demodulating a differential phase shift keyed (DPSK) input data-carrying signal. The data carried in each one of successive periods (herein referred to as "bit periods") of the carrier signal determines the phase of the carrier during that period as compared with the phase during the immediately preceding period. The demodulator to be described can recognize data having any one of four different values 1, 2, 3 and 4. The data value 1 is recognized when the phase of the signal during a bit period is 45° in advance of the phase during the immediately preceding period; the data value 2 is recognized when the phase of the carrier signal during a bit period is 135° in advance of the phase during the preceding period; the data value 3 is recognized when the phase during a bit period is 135° lagging on the phase during the preceding period; and the data value 4 is recognized when the phase during the symbol period is 45° lagging on the phase during the preceding period. FIG. 3 shows a vector diagram illustrating the different data values. In FIG. 3, the vector 10 is a reference vector and represents the phase of the input carrier signal during the immediately preceding bit period. Vectors 12, 14, 16 and 18 indicate the phases which the input carrier signal has when the data value is 1, 2, 3 and 4, respectively. In practice, noise and other interference may be such that the input carrier signal is not positioned exactly in line with one of the vectors 12 to 18. Therefore, the demodulator is arranged to indicate a data value of 1 whenever the input carrier signal's vector lies within the first quadrant. Similarly, the data values of 2, 3 and 4 are respectively detected when the input carrier signals's vector lies anywhere within the quadrants II, III and IV.

Figure 1:
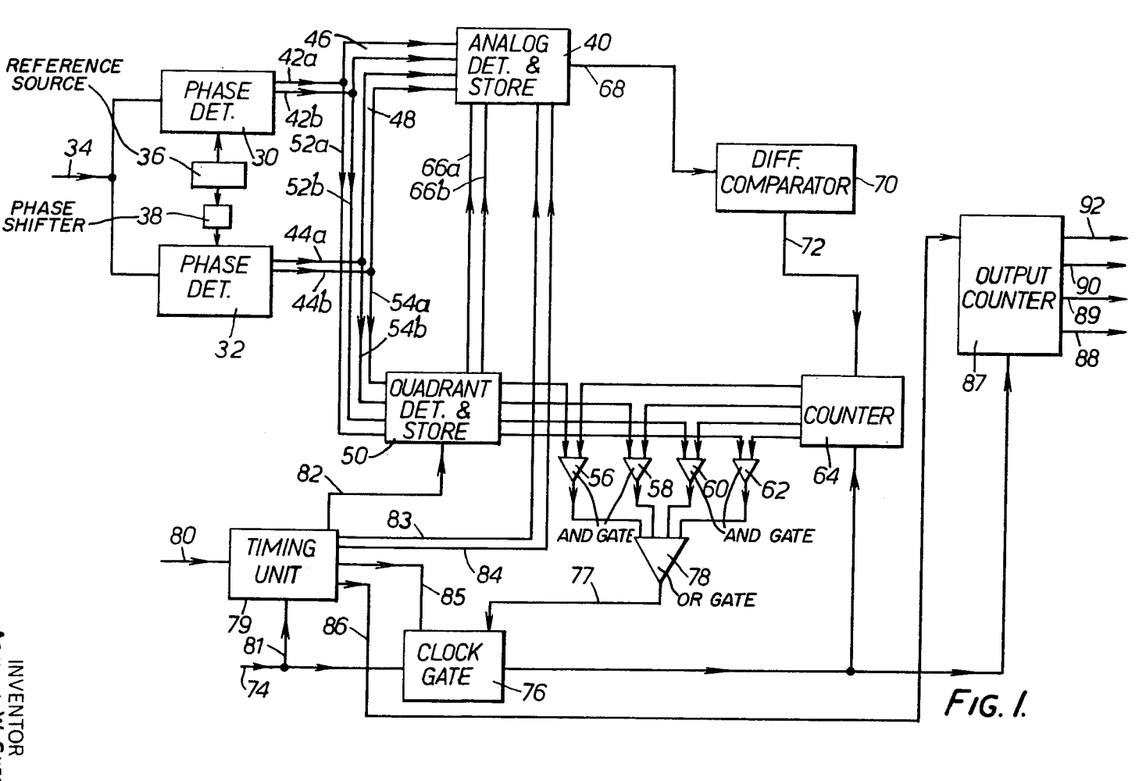
FIG. 1 is a block diagram of the system.

FIG. 1 shows the demodulator as comprising a pair of phase detectors 30 and 32 which each receive the input carrier signal on a line 34. Phase detector 30 is fed with a locally generated reference signal from a source 36, this reference signal having nominally the same frequency as, but not being phase locked with, the input carrier signal received on line 34. The phase detector 32 also receives the reference signal from the source 36 but the reference signal fed into the phase detector 32 is phase-retarded by 90° by a phase shifting circuit 38.

Each phase detector has two output lines, and the polarity and magnitude of the output produced between them depends on the phase of the input signal on line 34 relative to the particular phase reference received by the detector.

FIG. 2a shows the output characteristic of the phase detector 30. In FIG. 2a, the vertical axis representing the output on one of its two output lines, line 42a, relative to that on the other, line 42a, while the horizontal axis represents the phase difference between the input signal on line 34 and the reference signal from the source 36. When the input signal on line 34 is in phase with the phase reference, line 42a is positive with respect to line 42b. As the phase of the input signal advances relative to that of the reference signal, the magnitude of the difference between the two lines 42a and 42b decreases until it becomes zero when the input signal is 90° in advance of the reference signal. As the phase advance becomes still greater, line 42b becomes positive with respect to line 42a, reaching a maximum magnitude at a phase advance of 180°. Similarly, the magnitude of the output on the line 42a relative to that on line 42b decreases as the phase of the input signal retards relative to that of the phase reference, and the difference between the lines 42a and 42b becomes zero when the input signal lags by 90° on the phase reference. As the phase lag increases still further, line 42b becomes positive relative to line 42a, reaching a maximum at a phase lag of 180°.

FIG. 2b shows the output characteristic of the phase detector 32. The vertical axis represents the output on its output line 44a relative to that on its output line 44b. The horizontal axis is again the phase difference between the input carrier signal on the line 34 and the reference signal produced in the source 36. The shape of the characteristic is the same as that of the detector 30, but, because of the phase displacing circuit 38, the characteristic of phase detector 32 is shifted by 90° with respect to that of the detector 30.

Lines 42a and 42b are respectively connected to an analogue detector and store unit 40 by means of a pair of lines 46, while lines 44a and 44b are respectively connected thereto by a pair of lines 48. In addition, lines 42a and 42b are respectively connected to a quadrant detector and store unit 50 by means of lines 52a and 52b, and lines 44a and 44b are connected thereto by lines 54a and 54b.

Figure 2:
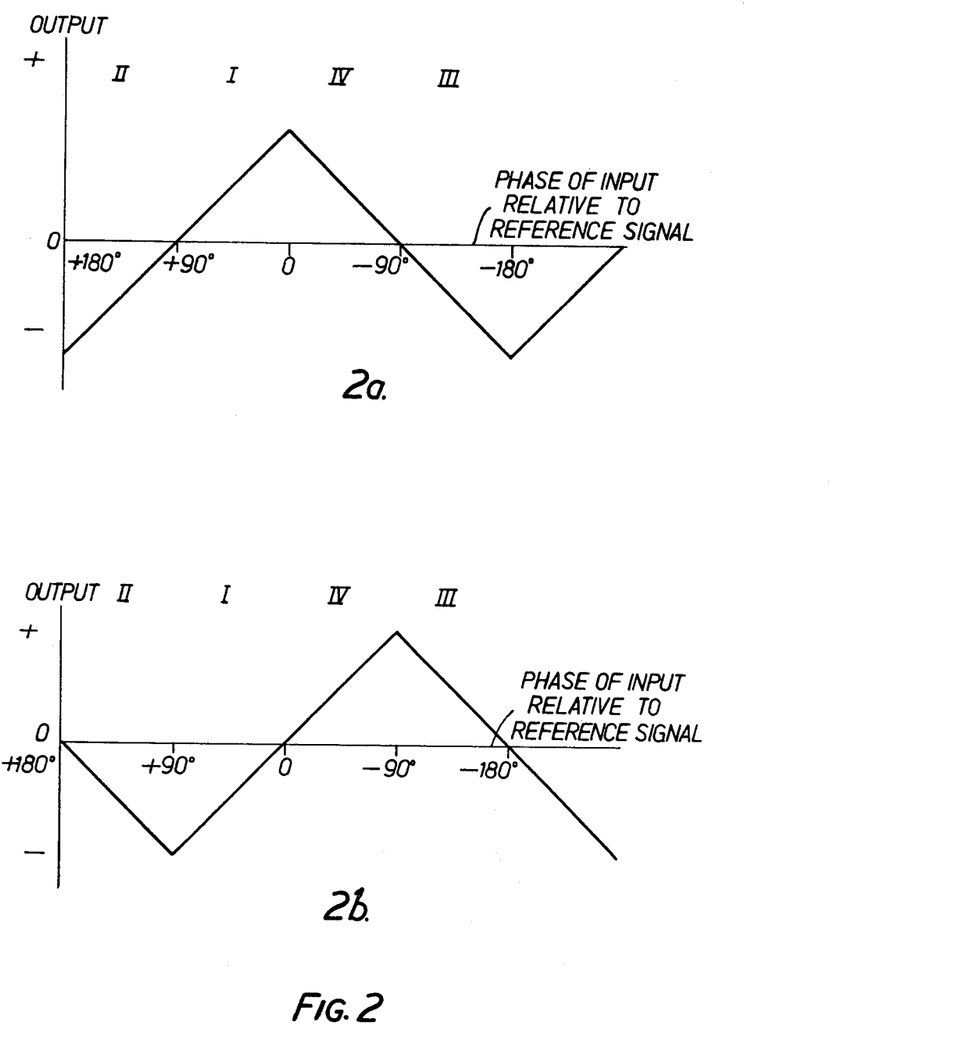
FIGS. 2a and 2b show the characteristics of two phase-detectors used in the system.

In FIG. 2, the references I and II, III and IV refer to the quadrants indicated in FIG. 3.

In a manner to be described, the quadrant detector 50 analyses the outputs from the two phase detectors and determines, and stores, the quadrant in which the input carrier signal vector lies during each bit period. The unit 50 has four output lines respectively connected to AND gates 56, 58, 60 and 62, and a particular one of these output lines is energized in accordance with the quadrant in which the vector is detected as lying. The second inputs of these AND gates are respectively fed from the different stages of a four-stage ring counter 64.

The analogue detector and store unit 40 is controlled by the quadrant detector and store unit 50 by means of signals on a pair of lines 66a and 66b and, in a manner to be described, produces, and stores, an analogue signal representing the angle of the input carrier signal measured positively from the beginning of its particular quadrant. Unit 40 has an output line 68 applied to a difference comparator 70. The comparator 70 energizes a control line 72 when it determines that the analogue signal on line 68 is less in one bit period than in the immediately preceding bit period. Line 72 is not energized if the analogue signal increases from one bit period to the next. When line 72 is energized, the counter 64 is caused to step forward by one count.

Clock signals are received from a line 74 and applied to a gate 76. The gate 76 is controlled by an output line 77 which is connected through an OR gate 78 to the outputs of the four AND gates 56 to 62. When any one of the AND gates is energized, line 77 causes the control gate 76 to be closed to prevent the passage of clock signals therethrough.

A timing control unit 79 receives signals on a line 80 which are synchronized with the bit periods. The unit 79 receives clock signals on a line 81 and produces timing signals on lines 82 to 86 at various times during the bit periods as will be explained later.

When neither line 77 nor 85 is energized, the clock signals pass through the control gate 76 and are applied to the counter 64 and also to an output store 87 comprising a four-state counter having four output lines 88, 89, 90 and 92 which are respectively connected to the four stages of the counter. The counter 87 is reset, by means of line 86, immediately following the end of each bit period and assumes the state in which line 88 is energized.

The operation of the demodulator will now be described.

Table I below shows the signs of the outputs from the two phase detectors 30 and 32 for each 90° of phase difference between the input signal vector and the reference signal produced by source 36 (the signs indicated are those of the output on line 42a relative to line 42b and of the output on line 44a relative to that on line 44b).

TABLE I

| Phase Detector | Quadrant I 0 to 90° | Quadrant II 90 to 180° | Quadrant III −90° to −180° | Quadrant IV 0 to −90° |
|---|---|---|---|---|
| 30 | +ve | −ve | −ve | +ve |
| 32 | −ve | −ve | +ve | +ve |

From Table I it is apparent that the respective signs of the two phase detector outputs form, for each 90° of phase difference, a unique combination. The quadrant detector (to be described in detail below with reference to FIG. 9) therefore contains logic which senses the signs of the phase detector outputs and determines, and stores, a number representing the particular quadrant of phase difference in which the input carrier signal vector lies during each bit period. Provided, therefore, that the reference signal from source 36 does not shift measurably in phase from one bit period to the next, the difference between the numbers successively stored by the unit 50 during two consecutive bit periods represents a particular one of the quadrants I to IV of FIG. 3 and this represents the data in the second of the two bit periods. The unit 50 energizes an appropriate one of the four output lines leading to the AND gates 56 to 62 according to the number which it stores during each bit period.

The analogue detector and store unit 40 is required to produce an analogue signal representing the angle of the input carrier signal vector measured positively from the beginning of its particular quadrant relative to the phase of the reference signal from source 36. The unit 40 receives signals on the control lines 66a and 66b from the unit 50 indicating the particular one of these quadrants in which the input carrier signal vector lies and, in response to this signal, selects, as the required analogue signal, the output from one or other of the two phase detectors. Thus, when the signals on control lines 66a and 66b indicate that the input carrier signal vector lies between 0° and 90° in advance of the reference signal from source 36, the unit 40 selects the output of phase detector 32 and uses this signal as its analogue output. FIG. 2b indicates that the output from phase detector 32 during quadrant I will have a positive value proportional to the angle of the input vector with respect to the reference signal.

In similar fashion, the unit 40 selects the output of the phase detector 30 when the control lines 66a, 66b indicate that the input vector lies in quadrant II (that is, between 90° and 180° in advance of the reference signal) and uses this output as the analogue signal.

When the control lines 66a and 66b indicate that the input vector lies in quadrant III(that is, between 180° and 270° in advance of the reference signal), the unit 40 uses the output of phase detector 32 as the analogue signal.

Finally, if the control lines 66a and 66b indicate that the input vector lies in quadrant IV (that is, between 270° and 360° in advance of the reference signal), the unit 40 uses the output of the phase detector 30.

Some specific examples of the operation of the system will now be considered.

It will be assumed that the comparison carried out by the comparator 70 indicates that the magnitude of the analogue signal produced during a bit period is not less than that produced during the preceding bit period. Therefore line 72 is not energized. At the end of the bit period, the store in the unit 50 is storing a number representing the quadrant, referred to the reference signal from source 36, in which the input vector lies. The bit timing signals on the line 85 then open the control gate 76 (line 77 not being energized at this time), and clock signals pass through and clock up the counters 64 and 87. When the counter of counter 64 becomes equal to the setting of the store in the unit 50, one of the AND gates 56 to 62 energizes line 77 and prevents further clock pulses from passing through the gate 76. Before the next bit period, line 86 is energized to reset counter 87 to 1.

During the next bit period, the quadrant detector unit 50 again determines the phase quadrant, referred to the reference signal, in which the input vector lies, and the analogue detector unit 40 produces an analogue output indicating the angle of the input vector with respect to the beginning of that quadrant. Assuming that the input vector does not lie in the same quadrant as during the preceding bit period, the state of the store in the unit 50 will no longer be equal to the state of the counter 64. Therefore, at the end of the bit period, line 77 will be unenergised and the control gate 76 will allow clock signals to pass through and to count up the counters 64 and 87. When the state of counter 64 becomes equal to the state of the store in the unit 50, the control gate 76 closes again. The number of clock pulses allowed through is thus equal to the number of quadrants through which the input vector has shifted as compared with its position during the immediately preceding bit period. This number of clock pulses is recorded by the state of the output counter 87 and indicated by energization of an appropriate one of the output lines 88 to 92. Therefore, the identity of the output line energized indicates the value of the data received during the bit period. It will be appreciated that, if the store in the unit 50 does not change state from one bit period to the next, line 77 will remain energized, clock pulses will not pass through to counters 64 and 87, and line 88 will thus be energized indicating the correct data value of 1; that is, it will indicate that the input vector has advanced by 45°±45° as compared with the previous bit period.

If the comparator 70 determines during any bit period that the magnitude of the analogue output from the unit 40 is less than the output during the immediately preceding bit period, this indicates that the number of quadrant boundaries which the input vector has crossed is more than the number of phase angles of 90° through which it has passed. Thus, for example, the comparator 70 will be activated when the input vector shifts from a position in and near the end of one quadrant to a later position in and near the beginning of the next quadrant. In such a case, the quadrant detector 50 will indicate a phase advance of one quadrant, thus apparently indicating a data value of 2. However, since the actual phase shift is less than 90°, the correct data value to be indicated is 1, and the contents of the store in unit 50 require correction by a subtraction of one quadrant. This is achieved by the comparator 70 which increases by 1 the contents of the counter 64. Thus, when the clock pulses pass through the control gate 76 at the end of the bit period, the number of clock pulses passed is less, by 1, than it would have been without operation of the comparator 70. Therefore, the output counter 87 produces a correct data value.

Some numerical examples will now be considered with reference to FIGS. 4, 5, 6 and 7. In these Figures, the angles marked are referred to the phase of the reference signal from source 36.

Figure 4:
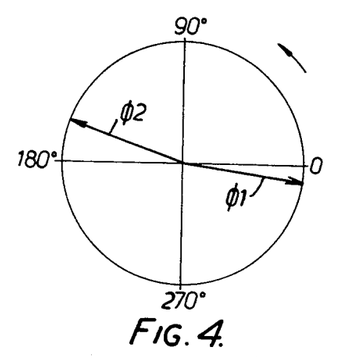

FIG. 4 shows the input vector as having a first value 01 where $$01 = 270° + 0.9 \cdot \pi/2.$$

During the next bit period, the input vector has a value 02 where $$02 = 90° + 0.8 \cdot \pi/2.$$

FIG. 4 shows that the input vector has crossed two quadrant boundaries, and this change would, if the comparator 70 were omitted, cause a count of 2 to be added to the initial count of 1 in the counter 87, indicating a data value of 3. In fact, however, the input vector has moved through less than 180°, and the correct data value is 2. This correct data value is in fact indicated by the demodulator because the comparator 70 detects that the analogue output $(0.8.\pi/2)$ of the unit 40 during the second bit period is less than that $(0.9\pi/2)$ during the first bit period. The comparator therefore increases the count of the counter 64 by 1 so that the output counter 87 receives only one pulse before gate 76 closes, and thus correctly indicates a data value of 2.

Figure 5:
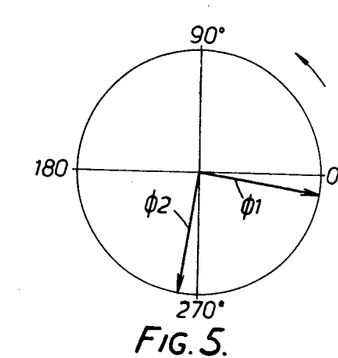

In FIG. 5, $$01 = 270° + 0.9\pi/2,$$

and $$02 = 180° + 0.95\pi/2.$$

The input vector in moving from 01 to 02 will cause the quadrant detector unit 50 to detect a change of three quadrants, thus indicating a data value of 4. A comparison of the values of 01 and 02 above shows that a data value of 4 is the correct value. This value will be indicated by the output counter 87 since, because the analogue value $(0.95.\pi/2)$ detected by the unit 40 during the second bit period is greater than that $(0.9.\pi/2)$ during the preceding bit period, the comparator 70 will be unactivated.

Figure 6:
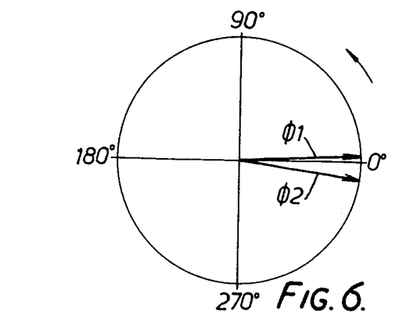

In FIG. 6, $$01 = 0° + 0.1 \cdot \pi/2,$$

and $$02 = 270° + 0.95 \cdot \pi/2.$$

The quadrant detector 50 will detect that the input vector has advanced by three quadrants, that is, a data value of 4, and consideration of the relative values of 01 and 02 above shows that this is the correct data value. This data value will be indicated by the output counter 87 because, since the difference between the analogue values of the signals 01 and 02 as produced by the unit 40 is positive, the comparator 70 will unactivated.

Figure 7:
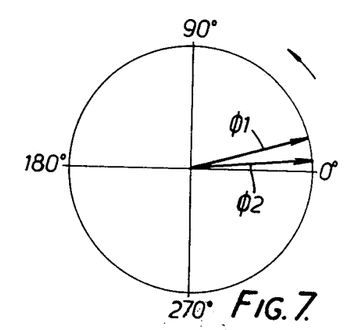

In FIG. 7, $$01 = 0° + 0.1\pi/2,$$

and $$02 = 0° + 0.05\pi/2.$$

The quadrant detector unit 50 will detect no change in the quadrant of the input vector, thus apparently indicating a data value of 1. However, reference to FIG. 7 shows that this is the incorrect data value because the input vector has moved through less than 360°. Since the difference between the analogue value of 02 and the analogue value of 01 is negative, the comparator 70 will be energized and will increase the count of the counter 64 by 1 to 2. Therefore, three clock pulses will be required to equalize the counter 64 with the quadrant detector store, and the output counter 87 will therefore indicate the correct data value of 4.

In summary, therefore, the demodulator system described uses the relationship $$0 < 02 - 01 < + \pi/2 \qquad 1$$

When 02–01 exceeds the upper limit, the unit 50 increases the quadrant number stored, and when it is less than the lower limit, the unit 40 decreases the effective number stored.

Figure 8:
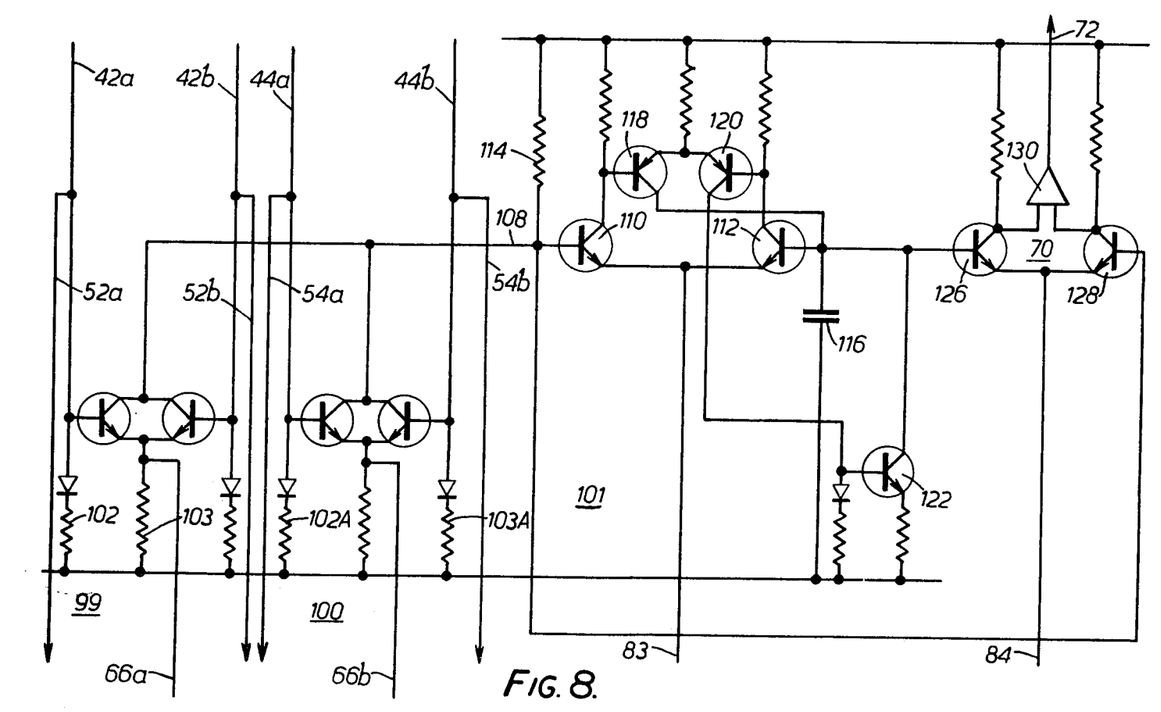
FIG. 8 is a circuit diagram of part of the system.

FIG. 8 shows a circuit diagram of the analogue detector and store unit 40 and the differential comparator 70. Items in FIG. 8 corresponding to items in FIG. 1 are correspondingly referenced.

The circuitry comprises two input circuits 99, 100 and a storage circuit 101.

The differential outputs on lines 42a and 42b from the phase detector 30 are respectively applied across two resistors 102 and 103 of input circuit 99 and are also passed to the quadrant detector and store unit 50 by means of the lines 52a and 52b. In addition, the differential outputs are applied to the base of two npn transistors having a common emitter circuit. Input circuit 100 is similar, and its components are distinguished by the suffix A and receive the two differential outputs on the lines 44a and 44b from the phase detector 32. The collectors of the two transistors of each input circuit 99, 100 are connected together and connected in common to a line 108 which feeds the storage circuit 101.

The storage circuit 101 comprises a pair of common-emitter npn transistors 100 and 112 which are normally OFF but can be switched on by a timing signal on the line 83 (FIG. 1). The storage circuit has an input resistor 114 across which the signal on the line 108 is developed, and the base of the transistor 110 is connected across this resistor. The base of the transistor 112 is connected across a storage capacitor 116. A pair of pnp transistors 118 and 120 is connected between the collectors of the two transistors 110 and 112. The collector of the transistor 118 feeds the capacitor 116, while the collector of transistor 120 is connected to the base of a further npn transistor 122.

The differential comparator 70 comprises a further pair of npn transistors 126 and 128 having their emitters connected together to the timing line 84. The collectors of these transistors are connected to the two inputs of a differential amplifier 130.

In operation, the differential outputs of the two phase detectors 30 and 32 are applied across the resistors 103, 102, 103A and 102A, and also passed to the quadrant detector and store unit 50. In the manner explained with reference to FIG. 1, the unit 50 determines, in accordance with the quadrant in which the input vector is detected, which phase detector output is to be used to produce the required analogue signal. Accordingly, the unit 50 energizes one or other of the two lines 66a and 66b so as to render conductive either the transistors of circuit 99 or the transistors of circuit 100. The appropriate phase detector output is thus fed to the storage circuit on the line 108 and develops an appropriate voltage across resistor 114.

At the end of a bit period the line 84 is energized by the timing unit but its effect will be ignored for the moment. The line 83 is then energized by the timing circuit and renders transistors 110 and 112 conductive. The voltage developed across resistor 114 is therefore transferred to, and stored in, capacitor 116.

During the next bit period, the procedure repeats and a new analogue signal is applied by the line 108 across resistor 114. When the line 84 is energized by the timing unit, transistors 126 and 128 are rendered conductive and respectively apply signals proportional to the voltage across the capacitor 116 (that is, the analogue voltage during the previous bit period) and the voltage across resistor 114 (that is, the analogue voltage during the current bit period) to the two inputs of the differential amplifier 130. The amplifier produces an output on line 72 if the current analogue signal is less than the previous analogue signal.

When the line 83 is energized, the voltage across transistor 114 is applied across and stored in capacitor 116.

The circuit of FIG. 8 is merely exemplary of many forms of circuit which can be used. For instance, transistors 110, 112, 118 and 120 may be replaced by a suitable field effect or metal oxide silicon transistor having its drain and source electrodes respectively connected to the resistor 114 and the capacitor 116, and its gate electrode connected to the line 83.

Figure 9:
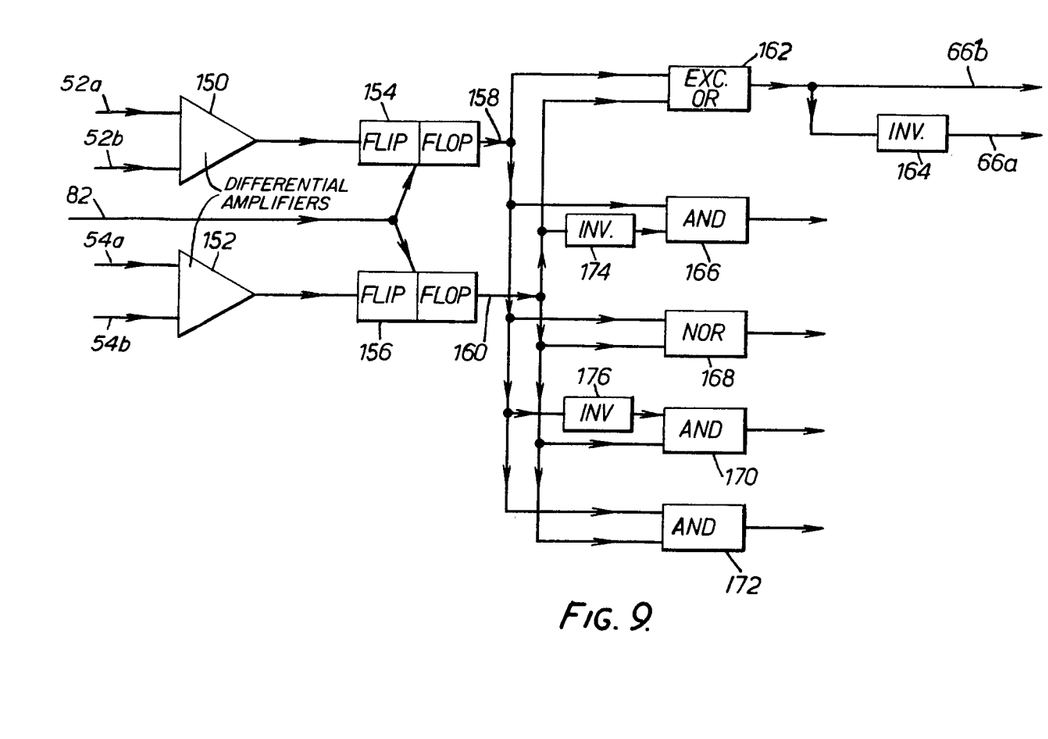
FIG. 9 is a logic diagram of another part of the system.

FIG. 9 shows one form which the quadrant detector and store unit 50 may take. The unit comprises two differential amplifiers 150 and 152 which respectively receive the detector outputs on the line pairs 52a, 52b and 54a, 54b. When line 52a is positive with respect to line 52b, amplifier 150 produces a "1" output; otherwise it produces a "0" output. Similarly, when line 54a is positive with respect to line 54b, amplifier 152 produces a "1" output; otherwise it produces a "0" output. The binary signals from the amplifiers 150 and 152 are respectively fed to flip-flop circuits 154 and 156, and set the flip-flops accordingly. At an appropriate moment during each bit period, the timing unit 79 (FIG. 1) energizes line 82 which causes the states of the flip-flops 154 and 156 to appear on their respective output lines 158 and 160.

Lines 158 and 160 are connected to the two inputs of an EXCLUSIVE OR gate 162 whose output is connected to the line 66b (FIGS. 1 and 8). Thus, line 66b is energized whenever the amplifiers 150 and 152 are producing different binary outputs: as shown from Table I, this occurs when the input signal vector is detected in quadrant I or quadrant III, and, as shown in FIG. 8, line 66b is accordingly connected to select the output from the phase detector 32. The line 66a is connected to the output of the EXCLUSIVE OR gate 162 through an inverter 164 so as to cause the analogue detector and store unit 40 to select the output from phase detector 30 during quadrants II and IV.

The lines 158 and 160 are also connected to the inputs of four other gates 166, 168, 170 and 172. Gate 166 is an AND gate with one of its inputs directly connected to the line 158 and the other connected to the line 160 through an inverter 174. Gate 166 therefore produces an output when amplifier 150 produces a "1" and amplifier 152 produces a "0". As shown by Table I, this indicates that the input vector is in quadrant I, relative to the reference signal, and the output of gate 166 is accordingly connected to gate 56 (FIG. 1).

Gate 168 is a NOR gate whose two inputs are respectively directly connected to the lines 158 and 160. Gate 160 thus produces an output only when both of the amplifiers 150 and 152 are producing a "0" output. As shown by Table I, this indicates that the input vector lies in quadrant II, and the output of gate 168 is accordingly connected to the AND gate 58 (FIG. 1).

Gate 170 is an AND gate with one of its inputs directly connected to the line 160 and the other connected to line 158 through an inverter 176. Gate 170 therefore produces an output only when amplifier 150 is producing a "0" output and amplifier 152 is producing a "1" output. As shown by Table I above, this indicates that the input vector lies in quadrant III, and the output of gate 170 is accordingly connected to AND gate 60 (FIG. 1).

Finally, the gate 172 is an AND gate with its two inputs directly connected to the lines 158 and 160. Gate 158 therefore produces an output only when both of the amplifiers 150 and 152 are producing "1" outputs. As shown by Table I, this indicates that the input vector lies in quadrant IV, and the output of gate 172 is accordingly connected to one input of gate 62 (FIG. 1).

Although the demodulator described uses a digital mode for detecting the quadrant of the input vector, and an analogue mode for detecting the angle within the quadrant, other arrangements are possible. For example, digital or analogue modes may be used for both detections, or the quadrant detection may be made using an analogue mode and the angle within the quadrant detected using a digital mode.

The demodulator described is constructed to deal with a symmetrical modulation system in which the possible phase changes are $\pm 45°$ and $\pm 135°$. However, this is merely exemplary of modulation systems with which the demodulator can be arranged to operate. The demodulator can, for example, be arranged to operate with an asymmetrical modulation system such as where the possible phase changes are $\pm 90°$ and $\pm 180°$. In such a case, the demodulator would operate using the relationship $$-\pi/4 \, \pi \, 02 - 01 < +\pi/4$$

instead of the relationship 1 above. That is, the output of the quadrant detector would be increased when $02 - 01$ exceeded the upper limit of this relationship and retarded when $02 - 01$ was less than the lower limit.

It has been assumed that the phase detectors have straight-line characteristics. In fact, divergence from straight-line characteristics is not important because, at the critical condition when $02 - 01 = 0$, the two analogue signals being compared would have been measured at the same point on the output characteristics of the phase detectors, and the shape of the characteristic is thus only of secondary importance.

The demodulator described can be modified to deal with multi-differential phase modulated signals by cascading extra analogue detector and quadrant detector units.

The demodulator described is advantageous in that it does not require the use of delay lines whose tolerances have to be small if errors are not to be produced. In the modulator described, the reference signal used by the phase detectors does not have to have a constant phase over a long period.

It will be appreciated that, under noise-free conditions and with no frequency offset between the input carrier signal and the reference signal, detection is possible using the quadrant detector and store unit 50 alone.

Figure 10:
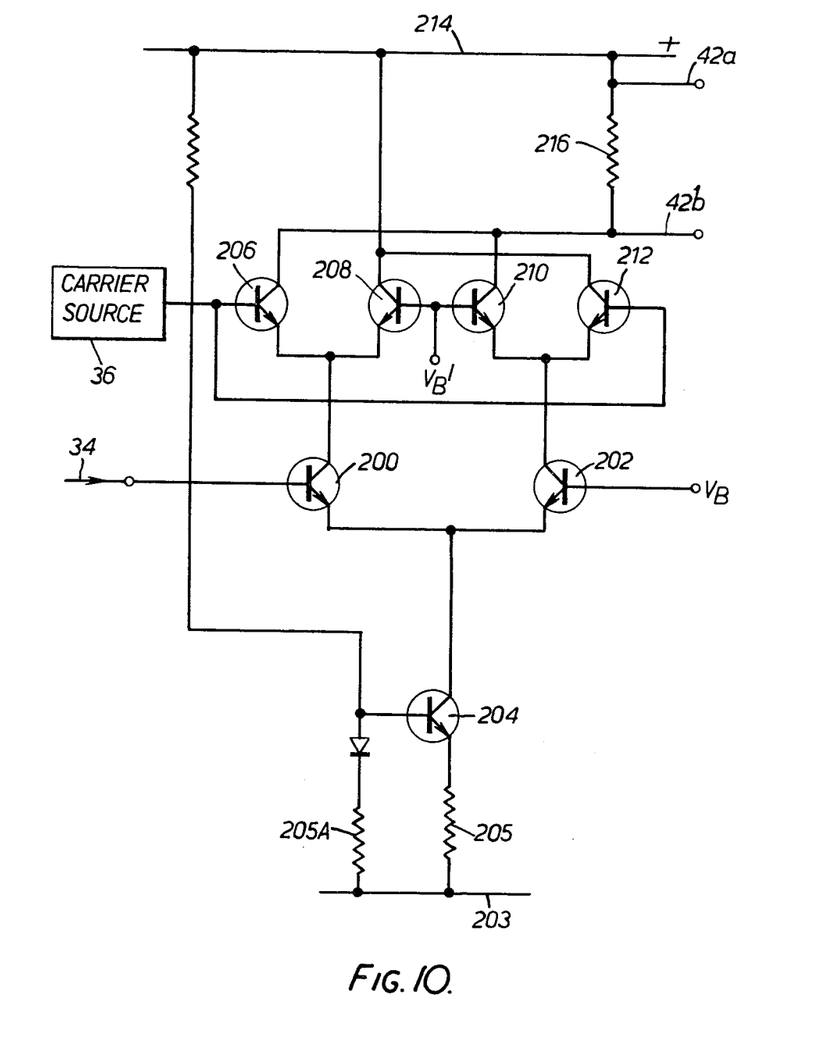
FIG. 10 is a circuit diagram of one phase detector of the system.

FIG. 10 shows the circuit diagram of one form which the phase detector 30 can take, items in FIG. 10 corresponding to those in the other Figures being similarly referenced.

The phase detector comprises a first pair of npn transistors 200 and 202 having their emitters connected together to the negative supply line 203 through a d.c. current source comprising a transistor 204 having equal value emitter and base resistors 205 and 205A. The base of transistor 200 is connected to receive the input carrier signal on line 34 while the base of transistor 202 is connected to a bias supply $V_B$. The collectors of transistors 200, 202 are respectively connected to the commoned emitters of two further pairs of npn transistors 206, 208 and 210, 212. The bases of transistors 206 and 212 are connected in common to the carrier source 36 while the bases of transistors 208 and 210 are connected in common to a bias supply $V_B$.

The collectors of transistors 208 and 212 are directly connected to the positive supply line 214 while the collectors of transistors 206 and 210 are connected thereto through a resistor 216 across which the lines 42a and 42b are connected.

In operation, a quadrature condition between the carrier and the input vector causes a small current to flow through resistor 216. Thus, if the carrier source is positive and the signal is zero, transistors 200 and 202 will conduct equally and the current through transistor 200 will flow through transistor 206 (which is highly conductive at this time) to resistor 216. The current through transistor 202 will be fed directly to line 214 by transistor 212. A similar current flows through resistor 216 when the carrier is zero and the input signal is positive. This current flows via transistor 206 which takes half the current flowing through transistor 200 (highly conductive at this time).

In the in-phase condition, when both the carrier and the input are positive (say), a high current flows through resistor 216, this current flowing through transistors 200 and 206. Thus, the volt drop across resistor 216 is higher than in the quadrature condition described above. A similar current flows when both the carrier and the input are zero or when they are both negative.

In the anti-phase condition, when, say, the carrier is negative and the input signal is positive, no current flows through the resistor 216 and the volt drop across it is therefore less than in the quadrature condition. Similarly, there is no current through resistor 216 when the carrier is positive and the input signal is negative.

The phase detector 32 can be of the same form, except that its carrier input is fed from the phase-shift circuit 38 instead of directly from the carrier source 36.

Although the phase detectors have been shown to produce differential outputs, phase detectors (having similar characteristics to that shown in FIG. 2) producing single-ended outputs may be used instead. In such a case the analogue detector and store 40 will still be fed with the output of an appropriate one of the detectors according to the particular detected quadrant, but it will be necessary to invert the output of detector 32, before feeding it to the unit 40, when the input vector lies in quadrant I and to invert the output of detector 30, before feeding it to unit 40, when the input vector lies in quadrant II: these inversions are necessary to obtain the correctly shaped characteristics. The outputs of the detectors would be directly fed to the quadrant detector and store 50 in the manner already described.

I CLAIM:

1. A demodulation system for demodulating an input signal in which the data carried in each of successive equal-duration periods is represented by the phase of the signal during that period with respect to the phase in the next preceding period, comprising phase-detector means connected to receive the input signal, means for supplying the phase-detector means with a phase reference valid for two said periods such that the output of the phase-detector means uniquely identifies the one of a plurality of predetermined phase segments, fixed relative to the phase reference, in which the input signal vector lies, and output means operative to compare the phase positions of the segments identified in two successive periods whereby to detect the phase change of the input vector in the second period with respect to its phase in the first period and to produce a data-indicating signal whose value is dependent on the detected phase change.

2. A system according to claim 1, further including means responsive to the output from the phase-detector means to produce, for each said period, an angle signal indicating the angle of the input vector relative to the beginning of the particular one of the segments identified for that period, and comparing means connected to compare the values of two successively produced angle signals and to produce a control signal when the angle of the input vector for the second of two periods is less than the angle for the first of the two periods, the output means comprising means operative, in the absence of the control signal, to control the value of the data-indicating signal in direct proportion to the number of segment boundaries between the input vector in the first of the two periods and the input vector in the second of the periods, and being operative in the presence of the said control signal to control the value of the data-indicating signal in direct proportion on one less than the said number.

3. A system according to claim 1, in which the phase-detector means comprises first and second phase-detectors each connected to receive the input signal, means operative to supply the first phase detector with a first predetermined phase reference such that the first phase detector produces an output signal dependent on the phase difference between the input signal vector and the first phase reference, means for supplying the second phase detector with a second predetermined phase difference equal to the first phase reference displaced by 90° such that the second phase detector produces an output signal dependent on the phase difference between the input signal vector and the second phase reference, and detecting means responsive to the phase-detector output signals whereby to produce for each said period a segment signal representative of the particular one of four 90° phase segments, fixed relative to the first phase reference, in which the input signal vector lies.

4. A system according to claim 3, in which the output means comprises means responsive to the said segment signal to store a first number identifying the particular 90° segment in which the input vector lies during one said period, means responsive to the said segment signal produced during the next period to generate a second number identifying the particular 90° segment in which the vector lies during that next period, means operative to count up the first number until it becomes equal to the second number, means responsive to the number of counts necessary to equalize the first and second numbers whereby to control the value of the data-indicating signal in direct dependence on the number of said counts.

5. A system according to claim 3, comprising means responsive to the output signals from the two phase-detectors to produce, for each said period, an angle signal indicating the angle of the input vector relative to the beginning of the 90° segment identified for that period, and comparing means arranged to compare the values of successively produced angle signals to produce a control signal when the said angle of the input vector for the second of two said periods is less than the said angle for the first of the periods, and in which the output means comprises means responsive to the said segment signal to store a first number identifying the said 90° segment in which the input vector lies during the said first period, means responsive to the said segment signal produced during the second said period to generate a second number identifying the 90° segment in which the input vector lies during that period, modifying means operative only in response to occurrence of the said control signal to increase by a count of one the stored first number, means operative to count up the first number, after its increase if any by the modifying means, until it becomes equal to the second number, and means operative to produce, as the data-indicating signal, a signal whose value is proportional to the number of equalizing counts necessary.

6. A system according to claim 5, in which each phase-detector comprises means operative to produce an analogue output signal whose sign is dependent on and whose magnitude is proportional to the phase difference between the input vector and the respective phase reference applied to that phase-detector, and in which the detecting means comprises digital means responsive to the respective signs of the two analogue output signals for each period to produce the said segment signal.

7. A system according to claim 6, in which the means operative to produce each said angle signal comprises selecting means responsive to the digital means to select a particular one of the two analogue output signals produced during each period as the angle signal for that period.

8. A system according to claim 3, in which the output means comprises
a ring counter,
means responsive to the said segment signal produced during one said period to set the counter in a count state proportional thereto,
means operative in response to the value of the segment signal produced during the next period to apply further counts to the ring counter sufficient to set it in a count state proportional to the latter segment signal,
registering means operative to register the number of said further counts, and
means operative to produce the data-indicating signal in direct dependence on the number of registered counts.

9. A system according to claim 8, including
means responsive to the output from the phase-detector means during each of two successive periods to produce a control signal when the angle of the input vector, relative to the beginning of its said segment, during the second of these periods is less than the corresponding angle for the first of the periods, and
modifying means responsive to the control signal to count up the count of the ring counter by one prior to the application of the further counts thereto, whereby the number of said further counts registered by the registering means is reduced by one.

10. A demodulation system for demodulating an input signal in which the data carried in each of successive equal-duration periods is represented by the number of equal-length phase-segments through which the input signal vector has moved from its phase-position during the next preceding period, comprising
means operative to establish a phase reference valid for at least two successive periods,
first detector means operative to compare the phase-position of the input vector with the phase reference and to determine, for each of the two periods, a serial number identifying the particular one of a plurality of successive phase-segments fixed relative to the phase reference in which the input vector lies,
second detector means operative to compare the phase-position of the input vector with the phase reference to produce for each said period an angle signal representative of the angle of the input vector within the particular phase segment identified for that period,
modifying means operative to compare the values of successively produced angle signals and to reduce by one the difference between the serial numbers determined for the two periods if the angle signal determined for the second period is less than that for the first period, and
output means operative to produce a data-indicating output signal whose value is proportional to the said difference, after any reduction thereof by the modifying means.

11. A system according to claim 10, including a ring counter and means for setting the ring counter to a count equal to the said serial number determined during the first of the two periods, the modifying means comprising means operative if the angle signal for the second period is less than that for the first period to increase the count of the counter by one, and the output means comprising means operative to count up the count of the counting means until its count becomes equal to the said serial number determined during the second period and registering means operative to register the number of counts required therefor and to adjust the value of the data-indicating signal to be equal to the number of registered counts.

12. A system according to claim 3, in which the midpoints of the said phase segments are respectively $\pm 45°$ and $\pm 135°$ displaced relative to the phase reference.

13. A system according to claim 3, in which the midpoints of the said phase segments are respectively $\pm 90°$ and $\pm 180°$ displaced relative to the phase reference.

14. A system according to claim 10, in which each phase segment is 90° in length, and in which the first detector means comprises a first phase-detector operative to compare the phase of the input signal with the phase of the said phase reference whereby to produce a first output signal whose sign and magnitude are dependent on the phase of the input signal relative to the phase reference, and a second phase-detector operative to compare the phase of the input signal with the phase of the phase reference displaced by 90° whereby to produce a second output signal whose sign and magnitude are dependent on the phase difference between the input signal and the phase reference displaced by 90°, and means responsive to the signs of the two outputs to produce a serial-number-representing-signal having a value of 1, 2, 3 or 4 according to the identity of the particular phase-segment in which the input vector lies.

15. A system according to claim 14, in which the midpoints of the said phase segments are respectively $\pm 45°$ and $\pm 135°$ displaced relative to the phase reference.

16. A system according to claim 14, in which the midpoints of the said phase segments are respectively $\pm 90°$ and $\pm 180°$ displaced relative to the phase reference.

* * * * *